US009938927B2

United States Patent
Ando et al.

(10) Patent No.: US 9,938,927 B2
(45) Date of Patent: Apr. 10, 2018

(54) PISTON

(71) Applicant: Fuji Jukogyo Kabushiki Kaisha, Tokyo (JP)

(72) Inventors: Koki Ando, Tokyo (JP); Yuichi Katakura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/257,778

(22) Filed: Sep. 6, 2016

(65) Prior Publication Data

US 2017/0082059 A1 Mar. 23, 2017

(30) Foreign Application Priority Data

Sep. 18, 2015 (JP) .................................. 2015-184719

(51) Int. Cl.
*F02F 3/28* (2006.01)
*F02F 1/24* (2006.01)
(Continued)

(52) U.S. Cl.
CPC ............ *F02F 3/285* (2013.01); *F02B 17/005* (2013.01); *F02B 23/104* (2013.01); *F02F 1/242* (2013.01);
(Continued)

(58) Field of Classification Search
CPC ............ F02B 23/104; F02B 2075/125; F02B 2275/48; F02B 2023/106; F02B 23/0669;
(Continued)

(56) References Cited

U.S. PATENT DOCUMENTS 6,173,690 B1 * 1/2001 Iriya .................... F02B 17/005
123/295
6,725,828 B1 * 4/2004 Han ..................... F02B 17/005
123/285
(Continued)

FOREIGN PATENT DOCUMENTS

JP    H 10-317973 A    12/1998
JP    2000-130171 A    5/2000
(Continued)

OTHER PUBLICATIONS

Japanese Office Action dated Sep. 27, 2016 with an English translation thereof.
(Continued)

*Primary Examiner* — Long T Tran
(74) *Attorney, Agent, or Firm* — McGinn I.P. Law Group, PLLC.

(57) ABSTRACT

A piston is used for an engine including: an ignition plug disposed in the vicinity of a central axis of a cylinder; intake and exhaust ports disposed at positions where the ignition plug is interposed therebetween; and an injector disposed at a position offset from the ignition plug toward the intake port to inject fuel sprays toward a crown surface of the piston. The piston includes: a recess formed by recessing the crown surface of the piston with respect to other portions of the crown surface, in which the recess includes a step on an outer peripheral edge over the entire circumference thereof with respect to the other portions, and a pair of lateral sides formed straightly so as to extend substantially in parallel to a straight line connecting the injector and the ignition plug when seen in a direction of the cylinder axis.

12 Claims, 6 Drawing Sheets

(51) Int. Cl.
*F02B 17/00* (2006.01)
*F02B 23/10* (2006.01)

(52) U.S. Cl.
CPC ..... *F02B 2023/103* (2013.01); *F02B 2275/40* (2013.01); *Y02T 10/125* (2013.01)

(58) Field of Classification Search
CPC .............. F02B 23/0696; F02B 23/0621; F02B 23/0693; F02B 2023/108; F02F 3/12
See application file for complete search history.

(56) References Cited

U.S. PATENT DOCUMENTS

| | | | | |
|---|---|---|---|---|
| 7,810,479 | B2* | 10/2010 | Naquin | F02B 23/08 123/193.6 |
| 8,151,762 | B2* | 4/2012 | Nishimoto | F02B 23/104 123/298 |
| 9,010,296 | B2* | 4/2015 | Teshima | F02B 23/104 123/193.4 |
| 2007/0068482 | A1* | 3/2007 | Yamashita | F02B 17/005 123/276 |
| 2009/0025680 | A1 | 1/2009 | Kihara et al. | |
| 2009/0235897 | A1* | 9/2009 | Fujikawa | F02B 23/104 123/305 |
| 2015/0167536 | A1* | 6/2015 | Toda | F02B 11/00 123/27 R |
| 2015/0337751 | A1* | 11/2015 | Watanabe | F02D 13/02 701/113 |

FOREIGN PATENT DOCUMENTS

| | | |
|---|---|---|
| JP | 2002-295261 A | 10/2002 |
| JP | 2006-257943 A | 9/2006 |
| JP | 2008-151020 A | 7/2008 |
| JP | 2009-024683 A | 2/2009 |
| JP | 2010-096088 A | 4/2010 |
| JP | 2013-113119 A | 6/2013 |
| JP | 2013-113120 A | 6/2013 |
| JP | 2015-021389 A | 2/2015 |

OTHER PUBLICATIONS

JPO Decision to Grant dated Jan. 10, 2017.
JPO Notification of Refusal dated Sep. 27, 2016, with English translation thereof (previously submitted on Oct. 20, 2016).

* cited by examiner

PISTON

CROSS-REFERENCE TO RELATED APPLICATIONS

The present application claims priority from Japanese Patent Application No. 2015-184719 filed on Sep. 18, 2015, the entire contents of which are hereby incorporated by reference.

BACKGROUND

1. Technical Field

The present invention relates to a piston for a spark-ignited cylinder fuel injection engine and, more specifically, to the piston having improved ignitability and combustion stability with respect to an air-fuel mixture.

2. Related Art

For example, in a spark-ignited cylinder fuel injection (direct injection) engine used as a travelling power source for a vehicle, improvements in ignitability and combustion stability of an air-fuel mixture are required. In order to achieve these improvements, forming an air-fuel-mixture rich area in a periphery of an ignition plug is required at the time of ignition, which enables desirable stratified charge combustion.

In the related art, in order to form such an air-fuel-mixture rich area (layer), various methods are proposed. These methods include providing a crown surface of a piston with an uneven shape which enables swirling up of fuel sprays that are injected from an injector toward the crown surface and guiding the swirled fuel sprays toward the ignition plug.

In order to achieve both a stratified charge combustion performance and an uniform combustion performance concurrently, for example, Japanese Unexamined Patent Application Publication (JP-A) No. 10-317973 describes a piston that is assembled to a pentroof type combustion chamber having two each of intake and exhaust valves. The piston includes a pair of intake valve recesses and a substantially true circle cavity combustion chamber that is formed at a central portion of the pair of intake valve recesses.

In order to expand an operating range that allows stratified charge combustion, JP-A No. 2000-130171 describes formation of a bowl stretching along a diameter line of a piston, which is orthogonal to a fuel spray axis, at a central portion of a crown surface of the piston, and a recess which is recessed further from a bowl surface and extends from an injector side to the bowl.

In order to increase a period that allows ignition at the time of stratified charge combustion, JP-A No. 2002-295261 describes formation of a recess at a central portion of a crown surface of a piston and a shelf having a smaller depth at a portion of the recess opposite to an injector.

In order to improve ignitability in a low load range, JP-A No. 2006-257943 describes formation of a recess having a substantially egg shape when seen in a direction of a cylinder axis on a crown surface of a piston.

In order to achieve combustion stability at the time of ignition retard without providing a deep cavity on a piston, JP-A No. 2008-151020 describes provision of a first step lower on an intake side and higher on an exhaust side on a crown surface and a second step provided beside the first step and being higher on an outer peripheral side of a cylinder under an ignition plug.

JP-A No. 2010-96088 describes formation of a groove-like recess stretching from a central portion of a crown surface to an outer peripheral surface of a piston in the vicinity of an injector. The recess has a depth increasing as it approaches a central portion of the piston.

JP-A No. 2013-113119 describes formation of a trapezoidal shaped cavity having a width decreasing gradually from an injector side toward a central portion of a piston.

JP-A No. 2013-113120 describes formation of a trapezoidal shaped cavity having a width increasing gradually from an injector side toward a central portion of a piston.

The aforesaid cylinder fuel injection engines that include the ignition plug disposed in the vicinity of the axial center of the cylinder and the injector disposed at a position offset from the ignition plug so as to inject fuel toward the town surface of the piston are desired to have improved ignitability and combustion stability with respect to the air-fuel mixture by making an air-fuel ratio in the periphery of the ignition plug richer and making an air-fuel-ratio rich area larger.

SUMMARY OF THE INVENTION

It is desirable to provide a piston that improves ignitability and combustion stability with respect to an air-fuel mixture.

The present invention solves the above problems as described below.

A first aspect of the present invention is related to a piston used for at engine that includes: an ignition plug arranged in the vicinity of a center axis of a cylinder, an intake port and an exhaust port disposed at positions where the ignition plug is interposed therebetween, and an injector disposed at a position offset from the ignition plug toward the intake port to inject a plurality of fuel sprays toward a crown surface of the piston. The piston includes a recess that is formed by recessing the crown surface of the piston with respect to other portions of the crown surface, the recess including a step on an outer peripheral edge over the entire circumference thereof with respect to the other portions of the crown surface, and a pair of lateral sides formed straightly so as to extend substantially in parallel to a straight line that connects the injector and the ignition plug when seen in a direction of the cylinder axis.

The injector may be a multiple hole injector that forms a plurality of fuel sprays, and the outer peripheral edge of the recess may be disposed at a position adjacent to hitting areas formed at least by the last fuel injection of the plurality of fuel sprays on the inner surface of the recess.

In this specification and Claims, "the last fuel injection" means an injection performed for the last time out of a series of injections when a plurality of times of fuel injections are performed in one combustion cycle. When only one time of the fuel injection is performed per one combustion, it means the corresponding injection.

DETAILED DESCRIPTION

The present invention achieves a subject of providing a piston having improved ignitability and combustion stability with respect to an air-fuel mixture by forming a recess on a crown surface of the piston, the recess having a long axis parallel to a direction of a line connecting an injector and an ignition plug when seen in a direction of a cylinder axis, having straightly formed lateral sides, and having a step with respect to a peripheral surface on an outer peripheral edge thereof over an entire periphery.

EXAMPLE

An example of a piston according to the present invention will be described below.

The piston of the example may be used for a gasoline cylinder fuel injection (direct injection) engine used for vehicles such as passenger vehicles as a travelling power source.

The engine includes a pentroof type combustion chamber 200 (see FIGS. 7A to 7C) including two intake valves and, two exhaust valves per cylinder disposed at a predetermined valve included angle.

The combustion chamber 200 includes an ignition plug (spark plug) 210 at a central portion (near an axial center of a cylinder bore).

The combustion chamber 200 includes a multiple hole injector 220. A nozzle of injector 220 is inserted into the combustion chamber 200 from a distance of a pair of the intake ports.

The injector 220 injects a plurality of fuel sprays (beams) toward a crown surface 100 of a piston 1 at a latter stage of a compression stroke.

Figure 1:
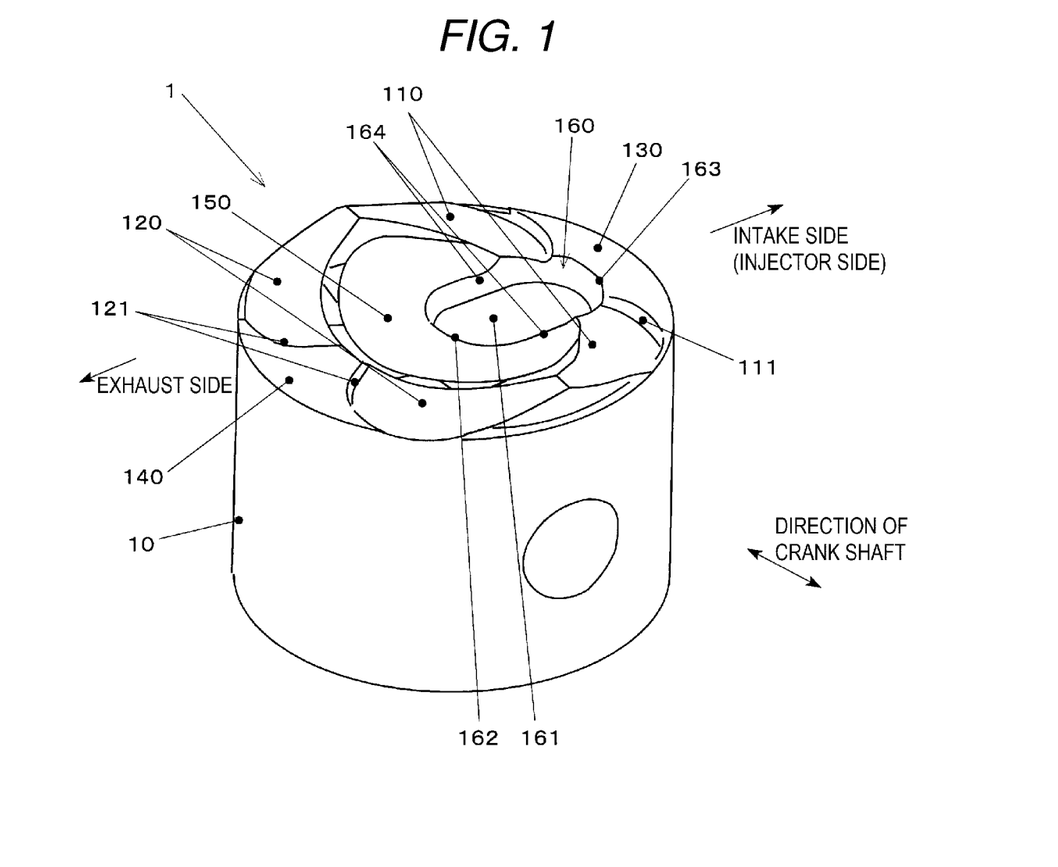
FIG. 1 is a perspective view illustrating an appearance of a piston according to an implementation of the present invention.

FIG. 1 is a perspective view illustrating an appearance of the piston of this example.

Figure 2:
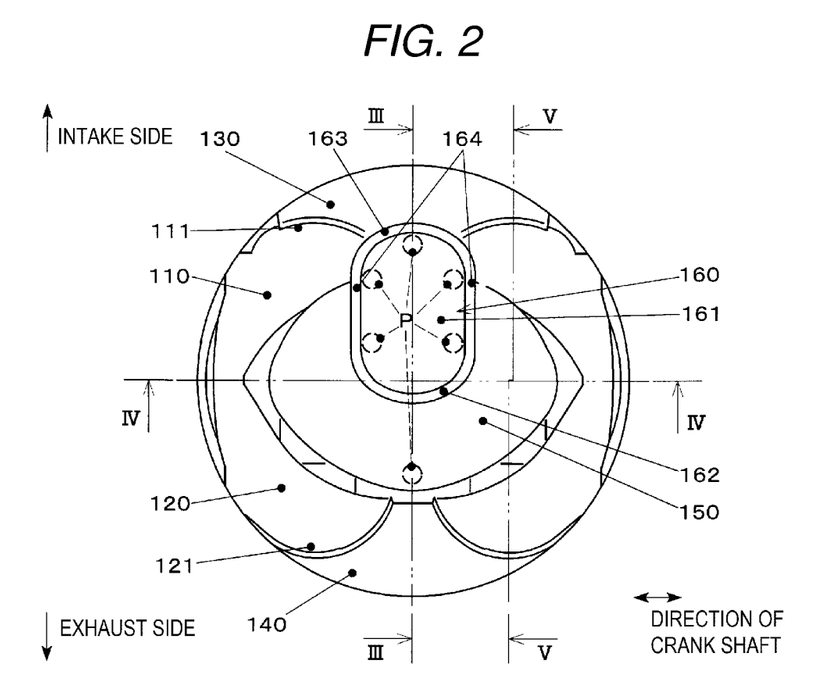
FIG. 2 illustrates a crown surface of the piston in FIG. 1 seen in a direction of a cylinder axis.

FIG. 2 illustrates the crown surface of the piston of FIG. 1 seen in a direction of a cylinder axis.

Figure 3:
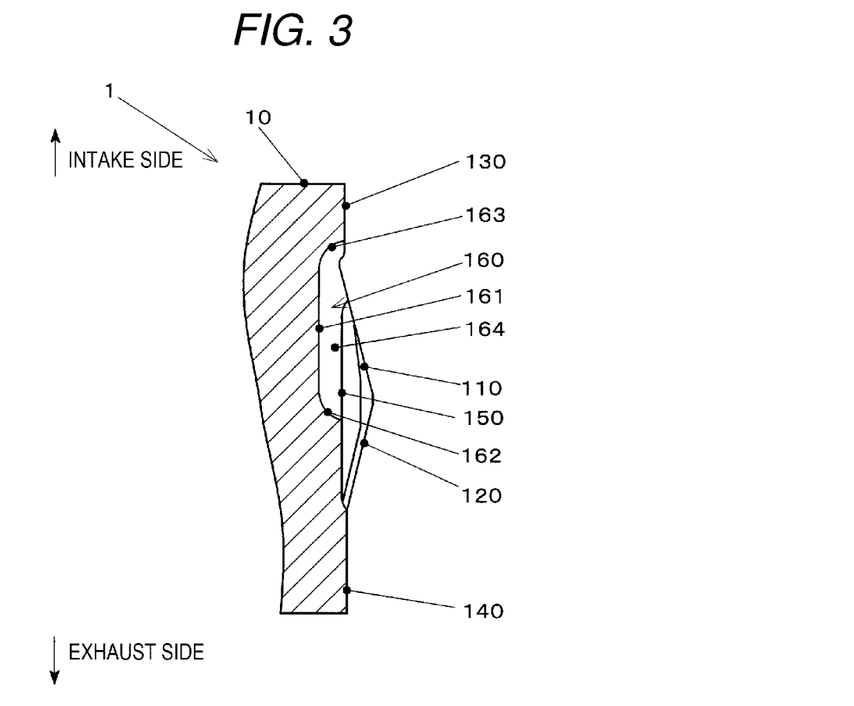
FIG. 3 is a cross sectional view seen in a direction indicated by arrows III-III in FIG. 2.

FIG. 3 is a cross sectional view seen in the direction indicated by arrows III-III in FIG. 2.

Figure 4:
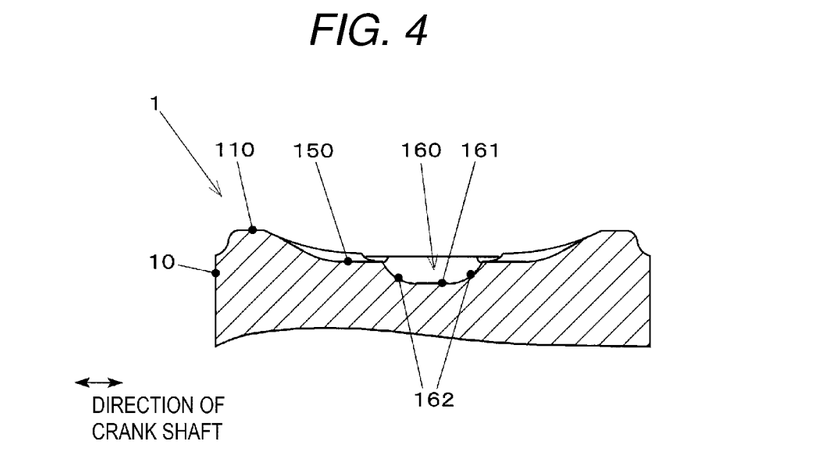
FIG. 4 is a cross sectional view seen in a direction indicated by arrows IV-IV in FIG. 2.

FIG. 4 is a cross sectional view seen in the direction indicated by arrows IV-IV in FIG. 2.

Figure 5:
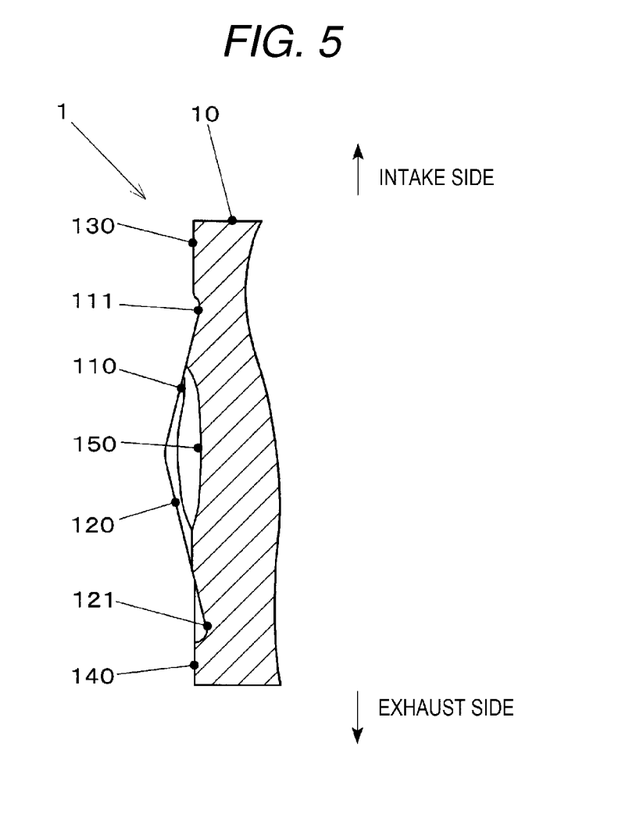
FIG. 5 is a cross sectional view seen in a direction indicated by arrows V-V in FIG. 2.

FIG. 5 is a cross sectional view seen in the direction indicated by arrows V-V in FIG. 2.

The piston 1 is formed by casting or forging, for example, an aluminum-based alloy to a rough shape and then applying a mechanical process and a surface treatment as determined in advance.

The piston 1 has an outer peripheral surface 10 having a substantially cylindrical outer surface and the crown surface 100, which is an and surface on a cylinder head side.

The outer peripheral surface 10 is disposed so as to face an inner peripheral surface of the cylinder and move in sliding contact therewith, and has a groove extending in a circumferential direction. A piston ring, an oil ring, and the like, which are not illustrated, are fitted into the groove.

The crown surface 100 is a disc-shaped surface which constitutes part of a combustion chamber of the engine in cooperation with the cylinder head and the like, which are not illustrated.

The crown surface 100 integrally has intake side bevels 110, exhaust side bevels 120, an intake side squish area 130, an exhaust side squish area 140, a flat area 150, and a recess 160.

The intake side bevels 110 and the exhaust side bevels 120 have a substantially flat surface and are disposed so as to face umbrella-shaped valve elements of the intake valves and the exhaust valves, which are not illustrated. The intake side bevels 110 and the exhaust side bevels 120 stretch substantially along a direction of a crank shaft.

The intake side bevels 110 and the exhaust side bevels 120 are disposed so as to match the shape of the pentroof typed combustion chamber 200 and incline with respect to a flat surface that is orthogonal to a center axis of a bore so as to protrude on the central side of the bore toward the cylinder head.

The intake side bevels 110 each have an intake valve recess 111 at an end opposite to the exhaust side bevels 120.

The exhaust side bevels 120 each have an exhaust valve recess 121 at an end opposite to the intake side bevels 110.

The intake valve recesses 111 and the exhaust valve recesses 121 are recesses that avoid interference of the intake valves and the exhaust valves with respect to the crown surface 100, and are disposed at two positions corresponding to the positions of the valves along the direction of the crank shaft.

The intake side squish area 130 and the exhaust side squish area 140 face the surfaces on the cylinder head side at a minute distance therebetween when the piston 1 takes a position in the vicinity of an upper dead center.

The squish areas 130 and 140 form a squish flow blowing cut toward the central side of the combustion chamber 200 when the piston 1 approaches a compression upper dead center, thereby activating a gas flow.

The intake side squish area 130 is formed from areas adjacent to the intake valve recesses 111 to an outer peripheral edge of the crown surface 100.

The exhaust side squish area 140 is formed from areas adjacent to the exhaust valve recesses 121 to the outer peripheral edge of the crown surface 100.

The intake side squish area 130 and the exhaust side squish area 140 have a flat shape which is substantially orthogonal to an axial line of the cylinder bore.

A flat area 150 is provided at a central portion of the crown surface 100, and a principal portion of the flat area 150 extends substantially along a plane substantially orthogonal to the axial line of the cylinder bore.

The flat area 150 is formed by recessing a central portion of the pentroof shape that is formed by the intake side bevels 110 and the exhaust side bevels 120.

As illustrated in FIG. 2 and so forth, the flat area 150 have an ellipse shape having a long axis substantially along the crank shaft direction in plan view seen in the direction of the axial line of the cylinder bore.

The flat area 150 is retracted slightly on a crank side with respect to the intake side squish area 130 and the exhaust side squish area 140.

An outer peripheral edge of the flat, area 150 is coupled to other surfaces via gentle recessed curved surface.

The recess 160 extends from the central portion of the crown surface 100 to the intake side squish area 110 recessed with respect to the other surfaces.

As illustrated in FIG. 2 and so forth, the recess 160 has an oval shape elongated along a direction connecting the ignition plug disposed at substantially a center of the cylinder bore and the injector when seen in the direction of the axial line of the cylinder bore.

The recess 160 has a bottom surface 161, a central-side step 162, an outer-diameter-side step 163, and straight guide steps 164.

The bottom surface 161 is a substantially flat surface formed on a deepest portion of the recess 160.

The bottom surface 161 has a flat shape substantially parallel to a plane that is orthogonal to the axial line of the cylinder bore.

The bottom surface 161 is recessed toward the crank by a predetermined dimension with respect to the principal portion of the flat area 150 in the periphery of the recess 160.

The central-side step 162, the outer-diameter-side step 163, and the straight guide steps 164 are stepped portions formed continuously along the outer peripheral edge of the recess 160 over the entire circumference.

The central-side step 162, the outer-diameter-side step 163, and the straight guide steps 164 rise from the bottom surface 161 toward the cylinder head, and coupling portions to the bottom surface 161 have a recessed curved shape.

In contrast, ends of the central-side step 162, the outer-diameter-side step 163, and the straight guide steps 164 on the cylinder head side are coupled to other surfaces so as to form pointed edges.

The central-side step 162 constitutes an end of the recess 160 on the bore central side (the ignition plug 210 side).

The central-side step 162 is disposed at a central portion of the flat area 150 and has a plan view having an arcuate shape substantially disposed so as to protrude on the exhaust side with a center angle of 180° when seen in the direction of the axial line of the cylinder bore.

The central-side step 162 is disposed so as to include the ignition plug 210 on an inner diameter side thereof when seen in the direction of the axial line of the cylinder bore.

The outer-diameter-side step 163 constitutes part of an end of the recess 160 on a bore outer diameter side (injector 220 side).

The outer-diameter-side step 163 extends along the intake side bevels 110 and the intake side squish area 130 and has, an arcuate shape having a central angle of 180° substantially disposed so as to protrude on the intake side in plan view when seen in the direction of the axial line of the cylinder bore.

The straight guide steps 164 are a pair of lateral sides (external common tangent for these arcs) provided in parallel to each other so as to linearly couple both ends of the central-side step 162 and both ends of the outer-diameter-side step 163, respectively.

The straight guide steps 164 are disposed substantially in parallel to a straight line connecting the ignition plug 210 and the injector 220 when seen in the direction of the axial line of the cylinder bore.

FIG. 2 illustrates hitting area P that the injector 220 forms on the crown surface 100 by the fuel sprays with broken line circles.

Here, the hitting areas P indicate hitting areas formed injection performed at last in a late stage of the compression stroke (the last fuel injection) when a plurality of times of fuel injection are performed per one combustion cycle.

In the case where the stratified charge combustion or the weak stratified charge combustion (an intermediate state between the stratified charge combustion and the uniform combustion) is performed by one fuel injection per one combustion cycle, the same hitting areas are obtained.

As illustrated in FIG. 2, the injector 220 is, for example, a multiple hole injector that forms six beam-shaped fuel sprays, and the five hitting areas P out of six are preset within the recess 160.

Four hitting areas P of these five fuel prays are formed 2 by 2 in areas adjacent to the respective straight guide steps 164, and the remaining one hitting area P is formed in an area adjacent to the end of the outer-diameter-side step 163 on the outer diameter side of the bore.

A hitting area P of another fuel sprays is formed in an exhaust side area of the flat area 150.

In this manner, the fuel sprays injected into the recess 160 are guided along the inner surface of the recess 160 toward the cylinder bore-central side, are swirled up toward the cylinder head by the recessed curved surface of the central-side step 162, thereby forming an air-fuel ratio rich area in the periphery of the ignition plug 210 immediate before an ignition time.

Hereinafter, an effect of the above-described example will be described in contrast with a comparative example of the present invention given below.

Instead of the oval shape of the example, a piston of the comparative example has the recess 160 having a substantially ellipsoidal shape (having no straight guide step 164) when seeing the recess 160 in a direction of a cylinder axis.

Figure 6A:
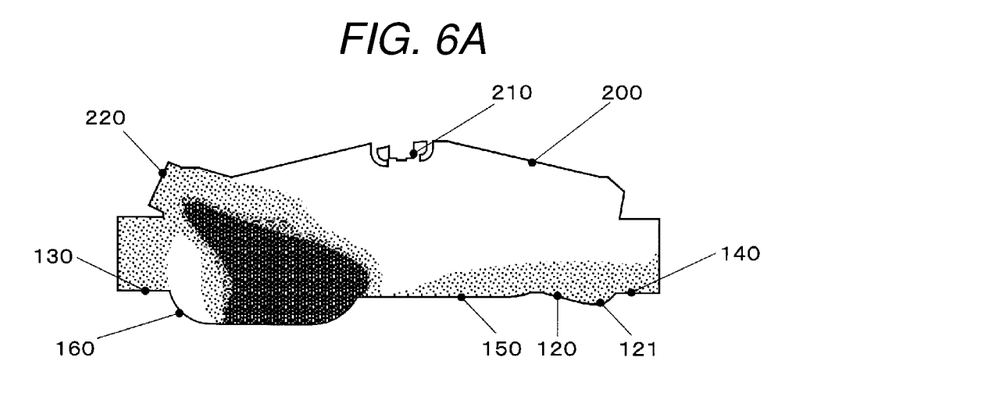
FIGS. 6A to 6C chronologically illustrate results of a behavior simulation of an air-fuel mixture in an engine provided with a piston of a comparative example of the present invention.
Figure 6B:
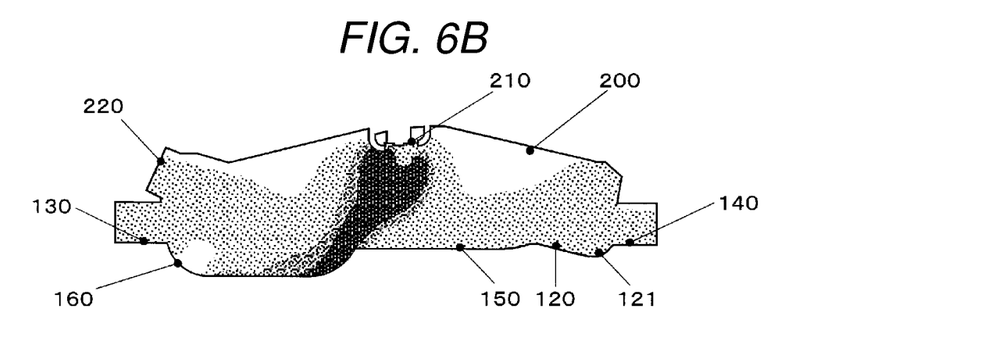
Figure 6C:
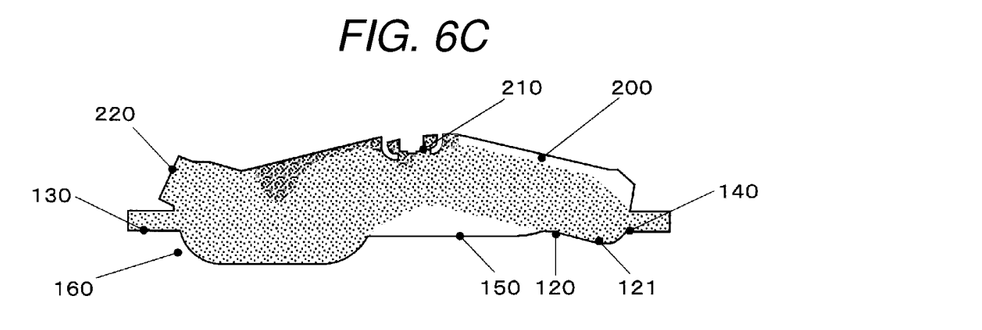

FIGS. 6A to 6C chronologically illustrate results of a behavior simulation of an air-fuel mixture in an engine provided with the piston of the comparative example.

Figure 7A:
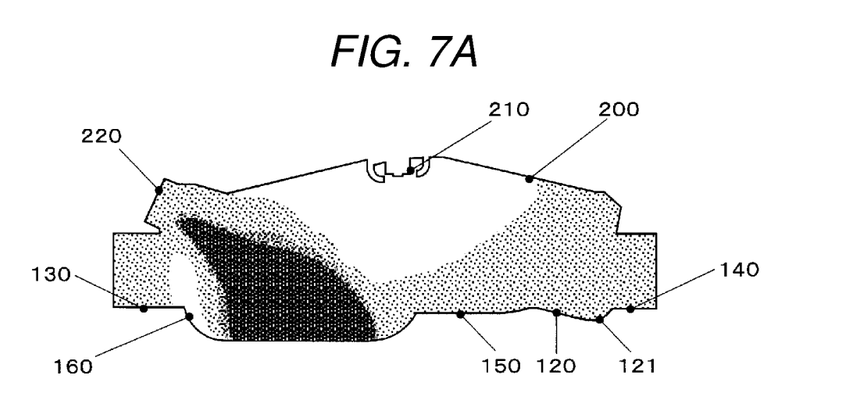
FIGS. 7A to 7C chronologically illustrate results of a behavior simulation of an air--fuel mixture in an engine provided with a piston of the example.
Figure 7B:
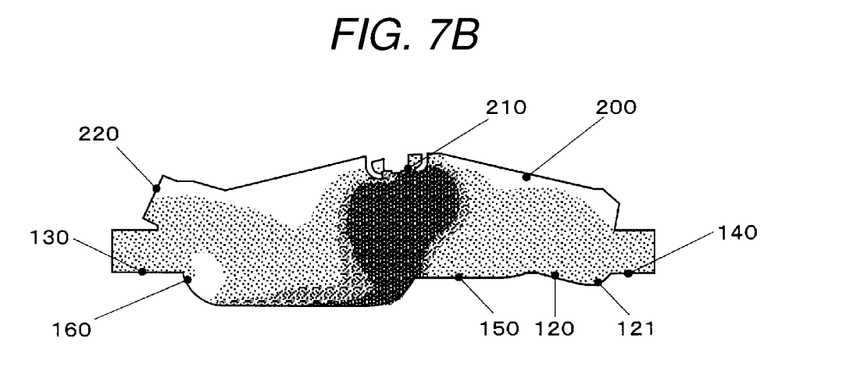
Figure 7C:
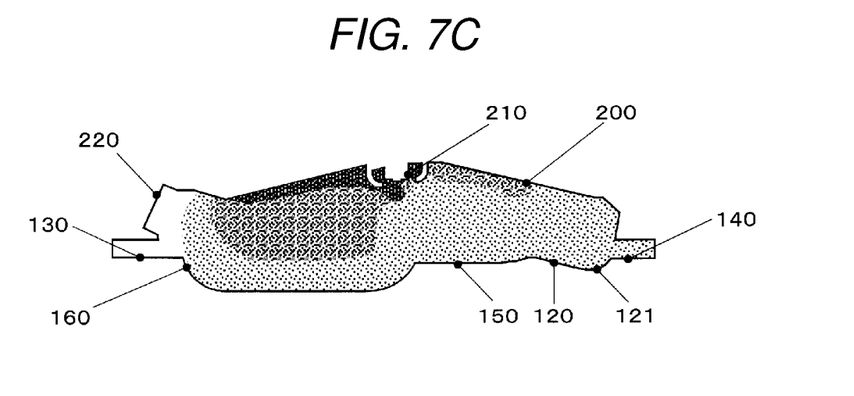

FIG. 6A, FIG. 6B, and FIG. 6C illustrate a cross section of the bore center taken orthogonally to an axis of rotation of the crankshaft at crank angles of A° before the compression upper dead center, B° before the compression upper dead center and C° after the compression upper dead center (where A°>B°>C°, C° is a degree at the time of ignition), and indicate that the darker pert has a richer air-fuel mixture (the same applies to FIGS. 7A to 7C).

In the comparative example, forming the air-fuel ratio rich area may be achieved to some extent in the periphery of the ignition plug 210 by guiding the fuel sprays toward the center of the cylinder bore by injecting a plurality of fuel sprays into the recess 160 and swirling up the same toward the ignition plug 210.

In the comparative example, however, relatively larger quantity of the air-fuel mixture is diffused on the intake side, and thus further richer area is desired in the periphery of the ignition plug 210.

FIGS. 7A to 7C chronologically illustrate results of the behavior simulation of the air-fuel mixture in the engine provided with the piston of the example of the present invention.

In the example, with the provision of the straight guide steps 164, the fuel sprays are guided toward the center of the cylinder bore efficiently while reducing leakage from the intake side of the recess 160, so that the fuel sprays may be swirled up at the central-side step 162 toward the cylinder head.

Consequently, as illustrated in FIG. 7C, the air-fuel mixture-rich area with respect to the comparative example may be formed from the periphery of the ignition plug 210 continuously to the intake side, so that the ignitability and the combustion stability may be improved.

As described thus far, according to the example, the following advantageous effects are achieved.

(1) The fuel sprays (fuel is gasified with the elapse of time to form an air-fuel ratio-rich air-fuel mixture layer) injected from the injector 220 hit on the crown surface 100 of the piston 1, then are guided linearly toward the ignition plug 210 by the recess 160 having the straight guide steps 164, then are swirled up along the curved surface of the central-side step 162 and are deflected toward the cylinder head so as to be collected efficiently to the periphery of the ignition plug 210.

With the central-side step 362, the outer-diameter-side step 163, and the straight guide steps 164 having a step and formed continuously along the entire circumference of the outer peripheral edge of the recess 160, probability of leakage of the fuel sprays from the recess 160 in a direction other than the direction toward the ignition plug 210 is reduced.

With these advantageous effects, the air-fuel ratio in the periphery of the ignition plug 210 may be made richer and the ignitability may be improved. In addition, the area having the rich air-fuel ratio in the periphery of the ignition plug 210 may be expanded to improve the combustion stability.

(2) With a plurality of beams out of the fuel sprays injected from the injector 220 at the last fuel injection being set to hit on points in the recess 160 adjacent to the outer peripheral edge, the fuel sprays are reliably guided toward the ignition plug 210 along the steps 162, 163, and 164 formed on the outer peripheral edge of the recess 160, so that the above-described advantageous effects are ensured.

(3) With the bottom surface 161 of the recess 160 set to be 2.5 mm or more deeper than the flat area 150, the fuel sprays injected into the recess 160 may be swirled up desirably toward the cylinder head at the outer peripheral edge of the recess 160, so that the above-described advantageous effects are further enhanced.

Modification

The present invention is not limited to the above example and various modifications and changes are allowed. These modifications and changes are also included in the technical scope of the invention. For example, the shape, the dimensions and the disposition of each portion of the crown surface of the piston are not limited to a configuration of the example described above, and may be modified as needed.

The piston according to the implementation of the present invention is not limited to a gasoline engine, and may be applied to engines using other fuels such as those forming an air-fuel mixture by injecting liquid fuel into a combustion chamber and performing spark ignition.

The invention claimed is:

1. A piston used for an engine that includes:
   an ignition plug disposed in a vicinity of a central axis of a cylinder;
   an intake port and an exhaust port disposed at positions where the ignition plug is interposed therebetween; and
   an injector disposed at a position offset from the ignition plug toward the intake port to inject a plurality of fuel sprays toward a crown surface of the piston,
   the piston comprising:
   a recess that is formed by recessing the crown surface of the piston with respect to other portions of the crown surface,
   wherein the recess includes:
   a bottom surface comprising a flat surface formed on a deepest portion of the recess;
   a step rising from the bottom surface on an outer peripheral edge over the entire circumference of the recess with respect to the other portions of the crown surface; and
   a pair of lateral sides rising from the bottom surface formed straightly so as to extend in parallel to a straight line that connects the injector and the ignition plug when seen in a direction of the cylinder axis.

2. The piston according to claim 1, wherein the injector is a multiple hole injector that forms a plurality of fuel sprays, and the outer peripheral edge of the recess is disposed adjacently to hitting areas formed at least by the last fuel injection of the plurality of fuel sprays on the inner surface of the recess.

3. The piston according to claim 1, further comprising a flat area provided at a central portion of the crown surface,
   wherein a principal portion of the flat area extends along a plane orthogonal to an axial line of the cylinder bore, and
   wherein the flat area is formed by recessing a central portion of a pentroof shape that is formed by intake side bevels and exhaust side bevels.

4. The piston according to claim 3, wherein the intake side bevels and the exhaust side bevels are disposed so as to match the shape of the pentroof typed combustion chamber and inclined with respect to a flat surface that is orthogonal to a center axis of a bore so as to protrude on the central side of the bore toward the cylinder head.

5. The piston according to claim 3, wherein the step is disposed at a central portion of the flat area and has a plan view having an arcuate shape disposed so as to protrude on the exhaust port side with a center angle of 180° when seen in a direction of an axial line of a cylinder bore.

6. The piston according to claim 1, wherein the bottom surface includes a flat shape parallel to a plane that is orthogonal to the axial line of the cylinder bore.

7. The piston according to claim 1, wherein the step is formed in an inside region of the crown surface of the piston with respect to an outer peripheral edge of the crown surface.

8. The piston according to claim 1, wherein the step and the pair of lateral sides are coupled to the other surfaces so as to form pointed edges.

9. The piston according to claim 1, wherein the step constitutes an end of the recess on an ignition plug side.

10. The piston according to claim 1, wherein the step is disposed so as to include the ignition plug on an inner diameter side thereof when seen in a direction of an axial line of a cylinder bore.

11. The piston according to claim 1, wherein the pair of lateral sides are provided in parallel to each other so as to linearly couple both ends of the step.

12. A piston comprising:
   a recess that is formed by recessing a crown surface of the piston with respect to other portions of the crown surface,
   wherein the recess includes:
   a bottom surface comprising a flat surface formed on a deepest portion of the recess;
   a step rising from the bottom surface on an outer peripheral edge over the entire circumference of the recess with respect to the other portions of the crown surface; and
   a pair of lateral sides rising from the bottom surface formed straightly so as to extend in parallel to a straight line that connects an injector and an ignition plug of an engine including the piston when seen in a direction of the cylinder axis.

* * * * *